United States Patent
Flores Guerra et al.

(10) Patent No.: US 11,983,812 B2
(45) Date of Patent: May 14, 2024

(54) MARKER-BASED REPRESENTATION OF REAL OBJECTS IN VIRTUAL ENVIRONMENTS

(71) Applicant: DISH Network L.L.C., Englewood, CO (US)

(72) Inventors: Jesus Flores Guerra, Denver, CO (US); Eric Pleiman, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 73 days.

(21) Appl. No.: 17/828,865

(22) Filed: May 31, 2022

(65) Prior Publication Data

US 2023/0386126 A1 Nov. 30, 2023

(51) Int. Cl.
*G06T 15/20* (2011.01)
*G06F 3/01* (2006.01)

(52) U.S. Cl.
CPC .............. *G06T 15/20* (2013.01); *G06F 3/011* (2013.01); *G06F 3/012* (2013.01); *G06F 3/017* (2013.01)

(58) Field of Classification Search
CPC . G06T 15/20; G06T 19/20; G06T 2219/2004; G06F 3/011; G06F 3/012; G06F 3/013; G06F 3/015; G06F 3/017; G02B 27/017; G02B 2027/0178; G02B 2027/0187
See application file for complete search history.

(56) References Cited

U.S. PATENT DOCUMENTS

| | | | | |
|---|---|---|---|---|
| 9,898,864 B2* | 2/2018 | Shapira | ................. | G06T 19/006 |
| 10,665,027 B2* | 5/2020 | Leppänen | ............... | G06F 3/012 |
| 11,500,510 B2* | 11/2022 | Tokuchi | ................. | G06F 3/011 |
| 2018/0046874 A1* | 2/2018 | Guo | ..................... | G06V 10/507 |
| 2019/0328312 A1* | 10/2019 | Schroeder | ............ | A61B 5/0075 |
| 2020/0042105 A1* | 2/2020 | Tanaka | .................... | G06F 3/017 |
| 2022/0244849 A1* | 8/2022 | Shoda | ................... | G06F 3/0304 |

\* cited by examiner

*Primary Examiner* — Vijay Shankar
(74) *Attorney, Agent, or Firm* — KW Law, LLP

(57) ABSTRACT

A process for rendering objects includes detecting a first surface of an object oriented in a first position. A first image is captured with a camera and at least partially captures a first marker on the first surface. A prompt requests manipulation of the object into a second position to expose a second surface to the camera in response to detecting a missing image of a marker. A second image of the second surface is captured with the camera and at least partially captures a second marker on the second surface. The object is rendered as a virtual representation in a virtual environment in response to detecting the first marker in the first image and the second marker in the second image. The size of the virtual representation is estimated based on the detected size of at least one of the first marker and the second marker.

20 Claims, 3 Drawing Sheets

MARKER-BASED REPRESENTATION OF REAL OBJECTS IN VIRTUAL ENVIRONMENTS

TECHNICAL FIELD

The present application relates generally to rendering three-dimensional objects in virtual environments. Various embodiments may be used in connection with virtual environments, metaverses, video games, or other computer-based or computer-enhanced environments that include renditions of three-dimensional objects.

BACKGROUND

Computer-based worlds have become immersive and intertwined with the real world as technology has matured to augment reality. These virtual and augmented worlds, video games, and other areas of cyberspace may be intertwined to form a metaverse that includes three-dimensional content. For example, virtual reality (VR) products, such as the VR headset offered under the tradename Meta Quest, offer users an immersive experience in a virtual environment or metaverse through peripheral devices capable of rendering three-dimensional audio and video. Such VR devices mimic real world sensory experiences and may present a fictitious or augmented environment rendered all or in part using virtual objects.

However, objects in the real world may not appear in these virtual environments. Similarly, objects in these virtualized environments may not exist in the real world. There are several barriers to integrating real-world objects into virtual environments. Creating objects in the metaverse, for example, can involve particularized programming or a redesign of the relevant VR software. The universe of perceivable objects in virtual environments is typically limited to specific, pre-determined objects and not tailored to user desires to import real object representations. These limitations may tend to restrict virtual-world participants from high levels of expression and personalized experiences in virtual environments.

BRIEF DESCRIPTION

Various embodiments relate to processes, computing systems, devices, and other aspects of integrated virtual reality systems executed by a processor of a computing device to represent real objects. An example process for rendering objects includes detecting a first surface of an object oriented in a first position and exposed to a camera. A first image of the first surface of the object is captured with the camera. The first image at least partially captures a first marker on the first surface. The process further includes prompting for manipulation of the object into a second position to expose a second surface to the camera in response to detecting a missing image of a marker. A second image of the second surface of the object is captured with the camera. The second image at least partially captures a second marker on the second surface. The object is rendered as a virtual representation in a virtual environment in response to detecting the first marker in the first image and the second marker in the second image. The size of the virtual representation is estimated based on the detected size of at least one of the first marker and the second marker.

In various embodiments, the first marker is at least partially visible in the second image. The virtual representation includes relative positions of the first marker and the second marker in the first image and the second image. A VR device prompts for manipulation of the real object in response to the camera detecting a duplicative image of the real object. The object can be manipulated by rotating the object 90 degrees from the first position to the second position.

The process includes capturing several images in some embodiments. For example, the process can include the steps of capturing a third image of a third surface of the object with the camera and at least partially capturing a third marker on the third surface. A fourth image of a fourth surface of the object is captured with the camera, and the fourth image at least partially captures a fourth marker on the fourth surface. A fifth image of a fifth surface of the object is captured with the camera, and the fifth image at least partially captures a fifth marker on the fifth surface. The process may further include capturing a sixth image of a sixth surface of the object with the camera, and the sixth image at least partially captures a sixth marker on the sixth surface. Rendering the object in a virtual environment occurs in response to the first image with the first marker, the second image with the second marker, the third image with the third marker, the fourth image with the fourth marker, the fifth image with the fifth marker, and the sixth image with the sixth marker. The virtual representation includes relative positions of the first marker, the second marker, the third marker, the fourth marker, the fifth marker, and the sixth marker on the object.

Another embodiment includes rendering a real object in a virtual environment and positioning a camera with a first surface of an object exposed to a camera in a first position, capturing a first image of the first surface of the object with the camera, and manipulating the object to expose a second surface to the camera in a second position. The first image at least partially captures a first marker on the first surface. A second image of the second surface of the object is captured with the camera, and the second image at least partially captures a second marker on the second surface. The process further includes rendering the object as a virtual representation in a virtual environment in response to the first image with the first marker and the second image with the second marker. The size of the virtual representation is estimated based on the size of at least one of the first marker and the second marker.

An embodiment of a client device is in communication with a host device serving a virtual environment. The client device comprises a processor, a non-transitory data storage, and an interface to a network. The non-transitory data storage is configured to store computer-executable instructions that, when executed by the processor, perform an automated process to render real objects in the virtual environment. The automated process comprises detecting a first surface of an object oriented in a first position and exposed to a camera, capturing a first image of the first surface of the object with the camera, and prompting for manipulation of the object into a second position to expose a second surface to the camera in response to a second marker being undetected in the first image. The first image at least partially captures a first marker on the first surface. The automated process further includes capturing a second image of the second surface of the object with the camera. The second image at least partially captures the second marker on the second surface. The object is rendered as a virtual representation in the virtual environment in response to detecting the first marker in the first image and the second marker in the second image. A size of the virtual representation is estimated based on the size of at least one of the first marker and the second marker. Other devices, systems, and automated processes may be formulated in addition to those described in this brief description.

DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

Figure 1:
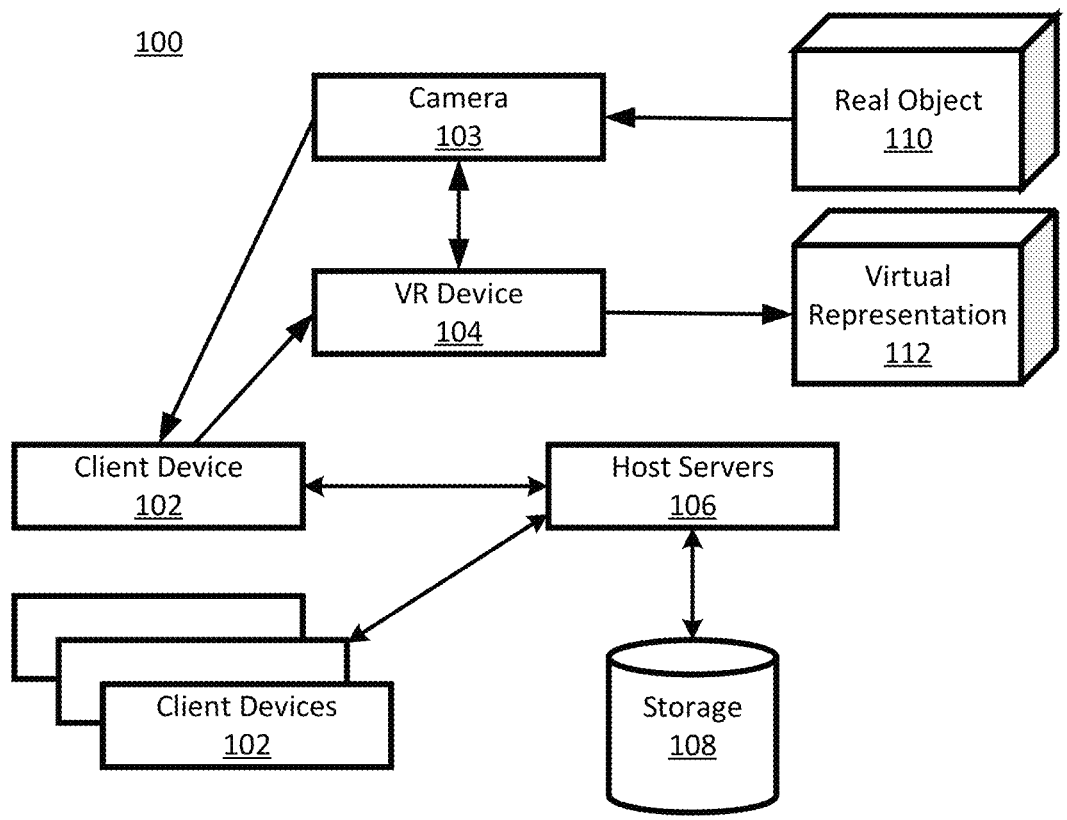
FIG. 1 illustrates an example system for ingesting real-world objects for representation in a virtual environment.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Various embodiments ingest real-world objects for representation in virtual environments. This allows for personalization of VR experience through presentation of real-world objects in a virtual environment. Users can then interact with representations of real objects in virtual environments. For example, users may grab a real-world object and have the object appear in real-time or near-real-time within the virtual environment. The ingested object may then exist in both the real world and the virtual environment, allowing the user to interact with it in either.

In various embodiments, virtual reality products include VR goggles, VR controllers, and passthrough cameras. Passthrough cameras can be an array of cameras or a single camera that enables users to see images of their surroundings rendered within the VR headset despite the VR headset being opaque. Passthrough cameras can detect object boundaries, dimensions, and size. To support detection of object boundaries, dimensions, and size, markers or stickers may be applied to label objects for importing into a virtual environment.

For example, a user with a toy sword affixes one or more stickers or markers to the toy sword. A computer-vision algorithm imports the physical characteristics of the toy sword and generates a similar digital, three-dimensional representation of the toy sword in the virtual environment. The user may then use the digital representation of his toy sword in a video game, for example. The markers may also be used to track the position of the object in the real world and correlate the real-world position with the position and view in the virtual environment. Continuing the example of a video game, the user may experience a character or avatar using a weapon that was not programmed as part of the original game software. In another example, a virtual environment mimicking a real location might include a three-dimensional rendition of the imported toy sword located and oriented as it is in the real location. In yet another example, a first user manipulates the real object rendered in the virtual world, and a second user observes the object from a different perspective than the first user.

Some embodiments record three-dimensional measurements made using the camera. Measurements are estimated by referencing a baseline object having a known size in proximity to the real-world object during importation, or by estimating distance from the camera and size in the resulting image. A baseline object is thus held or arranged next to the item being ingested into the virtual environment in some embodiments. For example, a quarter, dollar bill, or a pre-defined 1-inch cube that is used as a reference object may act as suitable baseline for importation. For handheld objects, a hand may be used as a baseline object. The imported object may be rendered in a proportional size to the hand of the avatar or character in the virtual environment.

As used herein, the term 'virtual environment' means any visual user experience that includes display of computer-generated renditions of three-dimensional objects. Examples of virtual environments include virtual reality, augmented reality (AR), mixed reality (MR), metaverses, video games, digital design tools, and other digital content that includes computer-based reproductions of three-dimensional objects.

Certain terminology relating to orientation of objects is used for the purpose of reference only and is not intended to be limiting. For example, terms such as "upper," "lower," "front," "back," "above," "top," "bottom," "side," and "below" refer to the orientation and/or location of portions of the component within a consistent but arbitrary frame of reference which is made clear by reference to the text and the associated drawings under discussion. Such terminology may include the words specifically mentioned above, derivatives thereof, and words of similar import. Similarly, the terms "first," "second," and other such numerical terms referring to structures do not imply a sequence or order unless clearly indicated by the context.

Referring now to FIG. 1, an example system 100 is shown for importing real object 110 into a virtual environment, in accordance with various embodiments. Computing devices in system 100 typically include a processor, a non-transitory data storage, and an interface to a network. The non-transitory data storage is configured to store computer-executable instructions executable by the processor to render a real-world object in the virtual environment. Computing devices of system 100 include client devices 102, VR devices 104, host servers 106, and storage 108.

Client devices 102 of system 100 is in electronic communication with camera 103. Examples of client devices 102 include tablets, laptops, computers, smartphones, or other computing devices useable to access virtual environments described herein. Camera 103 can include one camera, multiple cameras, sensors, or sensor arrays capable of capturing images for client device 102. Camera 103 may be integrated into client device 102 in some embodiments, though camera 103 may also be a peripheral device in communication with client device 102 in other embodiments. Camera 103 includes a communication channel to client device 102 such as, for example, Bluetooth®, WiFi®, USB, SATA, internal bus, or other wireless or wired communication channels.

In an example embodiment, camera 103 is an array of cameras placed around a room to capture images of real object 110 from different angles. Markers applied to different sides of real objects may be simultaneously captured in different cameras of the camera array. Using multiple cameras or image sensors may enable system 100 to render virtual representation 112 more quickly or more accurately than system 100 using a single camera or image sensor.

Camera 103 is configured to capture images of real object 110 in various orientations and from various angles. In that regard, camera 103 may be manipulable and movable to facilitate image capture on large or unwieldy real objects 110. Camera 103 may also be in a fixed or semi fixed location with real object 110 manipulable and movable relative to camera 103. Images are processed by client device 102 or VR device 104 for image rendering, storage, access, or transmission to other client devices 102 for rendition in a virtual environment.

Client device 102 is also in communication with VR device 104 in various embodiments. VR device 104 is any electronic device capable of rendering three-dimensional objects in a virtual environment. For example, VR device 104 may include a headset, smartphone, monitor, television, projector, or other viewing device capable of rendering one or more images containing three-dimensional renditions of objects. Camera 103 may be integrated into VR device 104. For example, a headset may include a VR device 104 with an integrated camera array capable of capturing passthrough images of surroundings for rendering in the visual output of VR device 104. VR device 104 may be integrated with client device 102, or VR device 104 may be a peripheral device in electronic communication with client device 102 over communication channels similar to those described above in the context of camera 103.

In various embodiments, host servers 106 hosts data or other content in support of a virtual environment. Host servers 106 may include one or more standalone servers, virtualized servers, distributed computing clusters, containers, networked computing devices, cloud services, or other computing devices capable of communicating with client device 102 over a network. Suitable networks for hosting a virtual environment may include a wide area network (WAN) such as the Internet, a telephony network, a public or private network of any sort, a cellular network, or the like.

Figure 2:
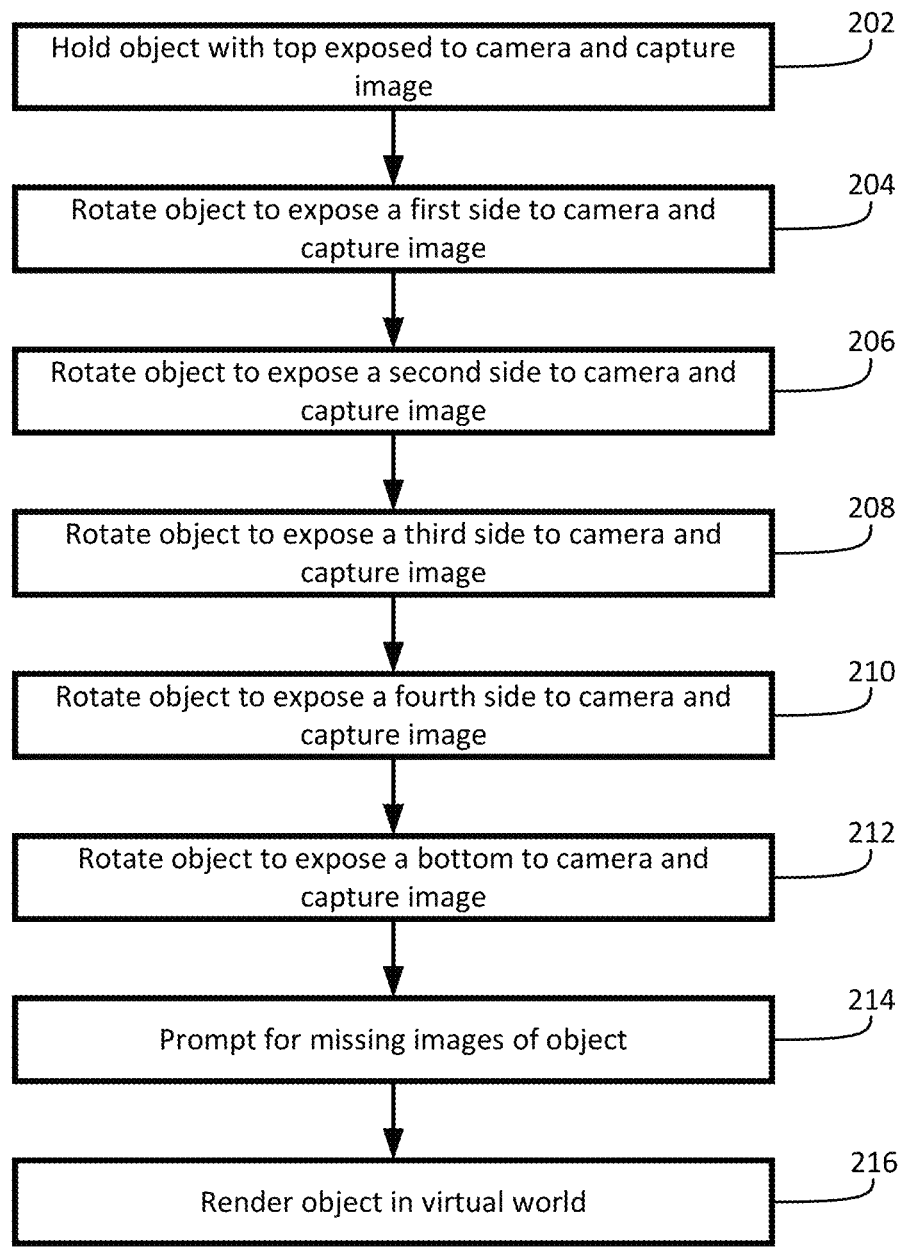
FIG. 2 illustrates an example process for ingesting a real-world object for representation in a virtual environment.

With reference to FIG. 2, an example process 200 for ingesting objects into a virtual environment is shown, in accordance with various embodiments. Process 200 describes one possible capture-hold protocol suitable for ingesting a real-world object into a virtual environment. A user holds real object 110 with the top of the object exposed to camera 103 and captures a first image (Block 202). The user may blink, click a button, make a gesture, or otherwise trigger camera 103 to capture an image of the top of the real object 110. Camera 103 may also be triggered using voice commands or other sound-based triggers in embodiments configured with a microphone such as, for example, when VR device 104 or camera 103 includes an integrated microphone. Camera 103 may also be set on a timer once the user initiates the capture protocol, or camera 103 may have a frame rendered on VR device 104 with camera 103 configured to automatically capture an image when the object sufficiently fills the frame in one or more directions.

In some embodiments, camera 103 is configured to automatically capture an image when a marker or tag adhered to the top of the object is visible, oriented, and sized in an acceptable manner relative to camera 103. Camera 103 and VR device 104 can both be configured to take predetermined actions in response to a marker being visible to camera 103. Markers described herein may be simple mono-colored shapes, shapes with halves or quadrants of different colors, QR codes, bar codes, colored letters, numbers, or other symbols suitable to convey size and orientation information about a real-world object when captured on camera 103. Markers may be adhered to multiple surfaces of real object 110 for ingestion and assessment. For example, a marker may be affixed to each side of real object 110 such as the top, bottom, and all four sides of a cube.

The user rotates the object exposing a first side to camera 103 and captures a second image (Block 204). The first side may be exposed to camera 103 by rotating the real object 110 by substantially 90 degrees relative to when the top was exposed to camera 103. As used herein in reference to angles, the term substantially may mean +\-5 degrees, +\-10 degrees, +\-15 degrees, +\-20 degrees, or +\-25 degrees a position visible to camera 103. The side is exposed sufficiently in some embodiments when the marker indicating the first side is the most visible or most prominent marker exposed to camera 103 in a still image.

The user rotates real object 110 to expose a second side of real object 110 to camera 103 and captures a third image (Block 206) of a second side of real object 110 adjacent the first side captured in block 204. Both sides may be adjacent the top side from block 202. In an example based on a three-axis space with three orthogonal axes X, Y, and Z, real object 110 may be rotated substantially along the X-Y plane in block 204 to expose the first side, and real object 110 may then be rotated substantially along the X-Z plane in block 206 to expose the second side adjacent the first side. Rotation to translate real object 110 from exposing the first side to the camera into a position exposing the second side to the camera may be a rotation through substantially 90 degrees. Rotating real object 110 to expose an adjacent side may be accomplished in some embodiments by exposing the marker on the adjacent side to the camera. The adjacent side is exposed sufficiently in some embodiments when the marker indicating the second side is the most visible or most prominent marker exposed to camera 103 in a still image.

The user again rotates real object 110 to expose a third side to camera 103 and captures a fourth image (Block 208). The user rotates real object 110 to expose a fourth side to camera 103 and captures a fifth image (Block 210). Each rotation made to expose a side of real object 110 may be similar to the rotation of block 204 and block 206. The rotations of block 208 and 210 may be along substantially the same plane as the rotation of block 206. In that regard, each of the sides exposed in blocks 204 through 210 are oriented adjacent one another and between the top and bottom surfaces of real object 110.

The user rotates real object 110 to expose the bottom to camera 103 (Block 212) and captures a sixth image. The rotation to expose the bottom surface of real object 110 to camera 103 may be along a plane substantially orthogonal to the plane of rotation in blocks 206, 208, and 210. The bottom of real object 110 may be disposed opposite the top of real object 110. Although the terms top and bottom are used in a relative manner describing the example embodiment of FIG. 2, other terms describing adjacent sides of real object 110 can also be used.

In various embodiments, system 100 via client device 102 or VR device 104 checks whether sufficient images are present to render real object 110 as a virtual representation 112 in a virtual environment. VR device 104 may prompt a user to reposition real object 110 relative to camera 103 and capture additional images in response to detecting missing images (Block 214). System 100 may thus allow for more images to be taken if pieces of real object 110 are missing in virtual representation 112.

In various embodiments, client device 102, VR device 104, or host servers 106 process real object 110 and render virtual representation 112 in the virtual environment (Block 216). The rendered virtual representation 112 or data used to model virtual representation 112 is typically stored in storage 108 accessible by host servers 106, but such data can also be stored in client device 102 or VR device 104 in other embodiments. During rendition, system 100 may stitch images together to form a three-dimensional model of real object 110. The images may be processed to estimate the approximate appearance of real object 110 from viewpoints other than the viewpoint of the original six images.

Although six images are referenced in the example embodiment of FIG. 2, the software could allow real-time panning or spinning of real object 110 to capture sufficient images to be brought into the virtual environment in some embodiments. In that regard, any number of still images or moving video images may be used to construct virtual representation 112 of real object 110. System 100 may correlate images or videos into relative positions based in part on markers affixed to each side or otherwise visible on real object 110 from different viewpoints.

Markers can include QR codes or tags detectable by camera 103. In some embodiments, markers may appear invisible to the naked eye but may nevertheless be detectable by camera 103. Markers can enable estimation of size, distance, and orientation of real object 110 relative to camera 103. Markers may be included in virtual representation 112 or edited out of virtual representation 112. A marker applied to an object can be configured to mark dimensional references. For example, a particular marker can be placed on the top, different sides, or the bottom to indicate particular features of real object 110. The markers can be packaged as stickers with instructions indicating the meaning or dimensional reference indicated by a particular marker. A user applies the markers following the application instructions, and system 100 references the markers as an aid in identifying features, surfaces, or dimensions of real object 110.

In various embodiments, markers can trigger camera 103 to capture an image. Camera 103 may also capture images in response to multiple markers being visible in a frame. Capturing multiple markers in a single image enables system 100 to create virtual representation 112 by matching other images with the same markers in different orientations relative to camera 103. Markers may also be used for color calibration where markers are generated with known colors. Images captured with a colored marker can be used to estimate color composition of the object adjacent the marker. System 100 may use image processing to detect edges of real object 110 in a given orientation.

System 100 may estimate the size of real object 110 using markers as described above in some embodiments. System 100 can also estimate size using a reference object near the real object 110. Examples of suitable reference objects include currency, a hand or body part, a ruler, or other objects that convey relative size through images captured by camera 103.

In an example embodiment, markers comprise QR codes printed on stickers for adhesion to surfaces of real object 110. QR codes may be color coded with a different color indicating different sides of real object 110. Extra colored stickers may also be included as alternates where a predetermined color code of a sticker is the same as or similar to the color of real object 110. The stickers may be 0.5 inch squares, 1 inch squares, 1.5 inch squares, or 2 inch squares. The stickers may also have other shapes and sizes, though the shape of the QR code in the present example is typically square. Extra markers may be adhered to surfaces of real object 110 on surfaces between QR codes. Extra markers applied in this way can be used by system 100 to orient real object 110 when captured in the same image as a QR code.

Figure 3:
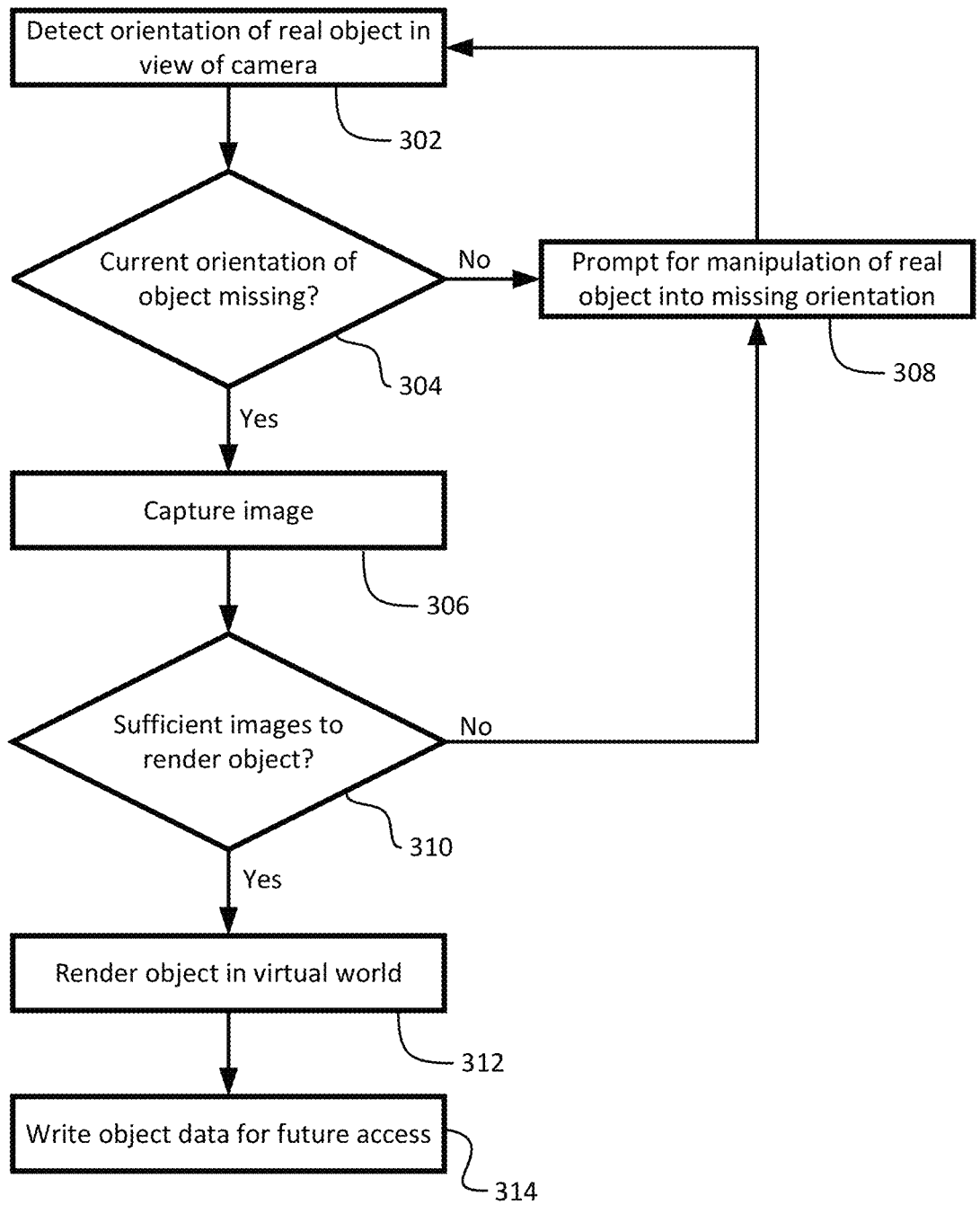
FIG. 3 illustrates an example process for ingesting a real-world object for representation in a virtual environment with prompting for manipulation of the real-world object, in accordance with various embodiments.

Referring now to FIG. 3, an example process 300 is shown for ingesting real object 110 into a virtual environment as a virtual representation 112. Process 300 includes detecting the orientation of a real object in view of camera 103 (Block 302). Object orientation may be detected as described herein. Client device 102 or VR device 104 in communication with camera 103 can access images captured by camera 103.

By processing images from camera 103, client device 102 or VR device 104 determine whether an image of real object 110 in the orientation currently captured by camera 103 adds data to support rendering (Block 304). System 100 can be configured to collect a predetermined number of images. System 100 can also be configured to continuously attempt to render virtual representation 112 and identify missing orientations for capture.

If the current orientation of real object 110 is not missing or does not otherwise add image data to support rendering virtual representation 112, then system 100 prompts the user to manipulate real object 110 into another orientation (Block 308). The prompt can be displayed or audible through VR device 104. Audio or text prompts describe the desired manipulation steps. Suitable manipulation steps for presentation by textual or audio description can include rotating clockwise relative to camera 103, flipping the object, moving the object closer to or farther from camera 103, or moving the position of a hand or support holding real object 110, for example.

In some embodiments, the prompt may also be an arrow visual in VR device 104 directing the user to translate the object, a curved arrow directing a user to rotate the object, an animated prompt directing the user to move the object closer or farther from camera 103, or any other prompt suitable to convey the desired physical manipulation of real object 110 to a user. Users can give input indicating a desired orientation or manipulation is unavailable to the user, for example, when an object is heavy, unwieldy, or otherwise unmovable by the user. System 100 can mark the missing image or orientation as unavailable and treat the orientation as captured in an image for purposes of prompting. Client device 102 or VR device 104 may detect the position of real object 110 relative to the camera image at regular intervals during manipulation, as described in block 302.

Camera 103 captures an image of an object in an orientation (Block 306) in response to detecting the orientation contributes additional or nonduplicative image data beneficial for rendering real object 110. In response to capturing a new image, client device 102 or VR device 104 determines whether sufficient images have been captured to render real object 110 into a three-dimensional virtual representation 112 (Block 310). If insufficient images have been collected, system 100 may continue prompting for manipulation of real object 110 in block 308. Client device 102 or VR device 104 renders virtual representation 112 in response to detecting sufficient images have been captured (Block 312). Rendering may take place at host server 106 in some embodiments, with VR device 104 or client device 102 transmitting image data to host server 106 for rendering. Object data is written to storage by host server 106 for future access (Block 314). Client device 102 of the user importing real-object 110 or client devices 102 of other users engaging the virtual environment may access object data hosted by host server 106. In that regard, a user may ingest real object 110 and share virtual representation 112 with other users.

Additional modifications can be made by the user to the imported object in the virtual environment. For example, an imported object such as the toy sword may be represented larger, smaller, translucent, colored, or otherwise modified from the real-world counterpart to the imported object. The modified version of the imported object may be manipulated in the virtual environment based on movement or manipulation of the real-world object.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

References to "one embodiment", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A client device in communication with a host device serving a virtual environment, the client device comprising a processor, a non-transitory data storage, and an interface to a network, wherein the non-transitory data storage is configured to store computer-executable instructions that, when executed by the processor, perform an automated process to render real objects in the virtual environment, the automated process comprising:
    detecting a first surface of an object oriented in a first position and exposed to a camera;
    capturing a first image of the first surface of the object with the camera, wherein the first image at least partially captures a first marker on the first surface;
    prompting for manipulation of the object into a second position to expose a second surface to the camera in response to a second marker being undetected in the first image;
    capturing a second image of the second surface of the object with the camera, wherein the second image at least partially captures the second marker on the second surface;
    capturing a third image of a third surface of the object with the camera, wherein the third image at least partially captures a third marker on the third surface;
    capturing a fourth image of a fourth surface of the object with the camera, wherein the fourth image at least partially captures a fourth marker on the fourth surface;
    capturing a fifth image of a fifth surface of the object with the camera, wherein the fifth image at least partially captures a fifth marker on the fifth surface;
    capturing a sixth image of a sixth surface of the object with the camera, wherein the sixth image at least partially captures a sixth marker on the sixth surface, the client device renders the object in a virtual environment in response to the first image with the first marker, the second image with the second marker, the third image with the third marker, the fourth image with the fourth marker, the fifth image with the fifth marker, and the sixth image with the sixth marker; and
    rendering the object as a virtual representation in the virtual environment in response to detecting the first marker in the first image and the second marker in the second image, wherein a size of the object in the virtual environment is estimated based on a size of at least one of the first marker and the second marker.

2. The client device of claim 1, wherein the virtual representation includes a relative position of the first marker and the second marker in the first image and the second image.

3. The client device of claim 1, wherein the automated process further comprises prompting for manipulation of the object in response to the camera detecting a duplicative image of the object.

4. The client device of claim 1, wherein rendering the object in a virtual environment occurs in response to the first image with the first marker, the second image with the second marker, the third image with the third marker, the fourth image with the fourth marker, the fifth image with the fifth marker, and the sixth image with the sixth marker.

5. The client device of claim 1, wherein the virtual representation includes relative positions of the first marker, the second marker, the third marker, the fourth marker, the fifth marker, and the sixth marker on the object.

6. The client device of claim 1, wherein the first marker is at least partially visible in the second image.

7. A process for rendering a real object in a virtual environment, comprising:
   detecting a first surface of an object oriented in a first position and exposed to a camera;
   capturing a first image of the first surface of the object with the camera, wherein the first image at least partially captures a first marker on the first surface;
   prompting for manipulation of the object into a second position to expose a second surface to the camera in response to detecting a missing image of a marker;
   capturing a second image of the second surface of the object with the camera, wherein the second image at least partially captures a second marker on the second surface;
   capturing a third image of a third surface of the object with the camera, wherein the third image at least partially captures a third marker on the third surface;
   capturing a fourth image of a fourth surface of the object with the camera, wherein the fourth image at least partially captures a fourth marker on the fourth surface;
   capturing a fifth image of a fifth surface of the object with the camera, wherein the fifth image at least partially captures a fifth marker on the fifth surface;
   capturing a sixth image of a sixth surface of the object with the camera, wherein the sixth image at least partially captures a sixth marker on the sixth surface; and
   rendering the object as a virtual representation in a virtual environment in response to detecting the first marker in the first image and the second marker in the second image, wherein a size of the object in the virtual environment is estimated based on a size of at least one of the first marker and the second marker.

8. The process of claim 7, wherein the first marker is at least partially visible in the second image.

9. The process of claim 8, wherein the virtual representation includes a relative position of the first marker and the second marker in the first image and the second image.

10. The process of claim 7, further comprising prompting for manipulation of the real object in response to the camera detecting a duplicative image of the real object.

11. The process of claim 7, manipulating the object further comprises rotating the object 90 degrees from the first position to the second position.

12. The process of claim 7, wherein rendering the object in a virtual environment occurs in response to the first image with the first marker, the second image with the second marker, the third image with the third marker, the fourth image with the fourth marker, the fifth image with the fifth marker, and the sixth image with the sixth marker.

13. The process of claim 12, wherein the virtual representation includes relative positions of the first marker, the second marker, the third marker, the fourth marker, the fifth marker, and the sixth marker on the object.

14. A process for rendering a real object in a virtual environment, comprising:
   positioning a camera with a first surface of an object exposed to a camera in a first position;
   capturing a first image of the first surface of the object with the camera, wherein the first image at least partially captures a first marker on the first surface;
   manipulating the object to expose a second surface to the camera in a second position;
   capturing a second image of the second surface of the object with the camera, wherein the second image at least partially captures a second marker on the second surface;
   capturing a third image of a third surface of the object with the camera, wherein the third image at least partially captures a third marker on the third surface;
   capturing a fourth image of a fourth surface of the object with the camera, wherein the fourth image at least partially captures a fourth marker on the fourth surface;
   capturing a fifth image of a fifth surface of the object with the camera, wherein the fifth image at least partially captures a fifth marker on the fifth surface;
   capturing a sixth image of a sixth surface of the object with the camera, wherein the sixth image at least partially captures a sixth marker on the sixth surface; and
   rendering the object as a virtual representation in a virtual environment in response to the first image with the first marker and the second image with the second marker, wherein a size of the object in the virtual environment is estimated based on a size of at least one of the first marker and the second marker.

15. The process of claim 14, wherein the first marker is at least partially visible in the second image.

16. The process of claim 15, wherein the virtual representation includes a relative position of the first marker and the second marker in the first image and the second image.

17. The process of claim 14, further comprising prompting for manipulation of the real object in response to the camera detecting a duplicative image of the real object.

18. The process of claim 14, manipulating the object further comprises rotating the object 90 degrees from the first position to the second position.

19. The process of claim 14, wherein rendering the object in a virtual environment occurs in response to the first image with the first marker, the second image with the second marker, the third image with the third marker, the fourth image with the fourth marker, the fifth image with the fifth marker, and the sixth image with the sixth marker.

20. The process of claim 19, wherein the virtual representation includes relative positions of the first marker, the second marker, the third marker, the fourth marker, the fifth marker, and the sixth marker on the object.

* * * * *